United States Patent
Rampal et al.

(10) Patent No.: US 8,240,601 B2
(45) Date of Patent: Aug. 14, 2012

(54) COUPLING WITH SLACK-TAKEUP, A ROTOR, AND A ROTARY WING AIRCRAFT

(75) Inventors: Etienne Rampal, Marseilles (FR); Elio Zoppitelli, Cabries (FR)

(73) Assignee: Eurocopter, Marignane Cedex (FR)

( * ) Notice: Subject to any disclaimer, the term of this patent is extended or adjusted under 35 U.S.C. 154(b) by 421 days.

(21) Appl. No.: 12/694,701

(22) Filed: Jan. 27, 2010

(65) Prior Publication Data

US 2010/0197415 A1 Aug. 5, 2010

(30) Foreign Application Priority Data

Jan. 30, 2009 (FR) .................................. 09 00402

(51) Int. Cl.
*B64D 27/00* (2006.01)
(52) U.S. Cl. ............ 244/54; 244/56; 244/7 A; 403/359.2
(58) Field of Classification Search .................. 244/54, 244/56, 7 A, 6, 7 R, 17.27, 17.23; 403/359.2, 403/359.1; 74/490.05; 416/148
See application file for complete search history.

(56) References Cited

U.S. PATENT DOCUMENTS

| | | | |
|---|---|---|---|
| 4,134,700 A | | 1/1979 | Nelson et al. |
| 4,292,001 A | | 9/1981 | Snell |
| 4,473,317 A | | 9/1984 | Bolang |
| 4,601,601 A | * | 7/1986 | Morris ....................... 403/359.2 |
| 4,805,475 A | | 2/1989 | Hannel |
| 5,533,825 A | | 7/1996 | Stone |
| 6,145,785 A | | 11/2000 | Certain |
| 6,260,793 B1 | | 7/2001 | Balayn et al. |
| 6,276,633 B1 | | 8/2001 | Balayn et al. |
| 6,514,003 B2 | * | 2/2003 | Horikawa .................. 403/359.2 |
| 6,604,885 B1 | * | 8/2003 | Neuner ....................... 403/359.2 |
| 6,607,161 B1 | | 8/2003 | Krysinski et al. |
| 6,644,588 B2 | * | 11/2003 | King et al. .................... 244/7 A |
| 6,695,254 B2 | | 2/2004 | Zoppitelli et al. |
| 6,712,313 B2 | * | 3/2004 | Zoppitelli et al. ......... 244/17.11 |
| 2010/0012775 A1 | * | 1/2010 | Howard et al. ................. 244/54 |

FOREIGN PATENT DOCUMENTS

| | | |
|---|---|---|
| DE | 196 44 241 | 7/1997 |
| FR | 2 791 319 | 9/2000 |
| FR | 2 791 634 | 10/2000 |
| FR | 2 798 359 | 3/2001 |
| FR | 2 837 462 | 9/2003 |
| GB | 2 309 504 | 7/1997 |

OTHER PUBLICATIONS

French Search Report dated Sep. 14, 2009, from corresponding French application.

* cited by examiner

*Primary Examiner* — Christopher P Ellis
(74) *Attorney, Agent, or Firm* — Brooks Kushman P.C.

(57) ABSTRACT

A coaxial rotary coupling (11) includes a hollow inner tube (4) and a hollow outer tube (7), with inner and outer splines (12 and 13) in mutual engagement. The coupling (11) further includes: approach elements for longitudinally approaching the inner and outer tubes (4, 7) together with elements presenting a wedge arrangement for causing the inner and outer tubes (4, 7) to turn (23) relative to each other in opposite directions so as to limit tangential assembly slack; a soleplate (16) of the driven tube (7); and a flange (17); the driving tubes (4) having complementary splines (12, 13, 18) together with dogs including force-transformation ramps (31) that are distributed peripherally within the coupling (11).

13 Claims, 3 Drawing Sheets

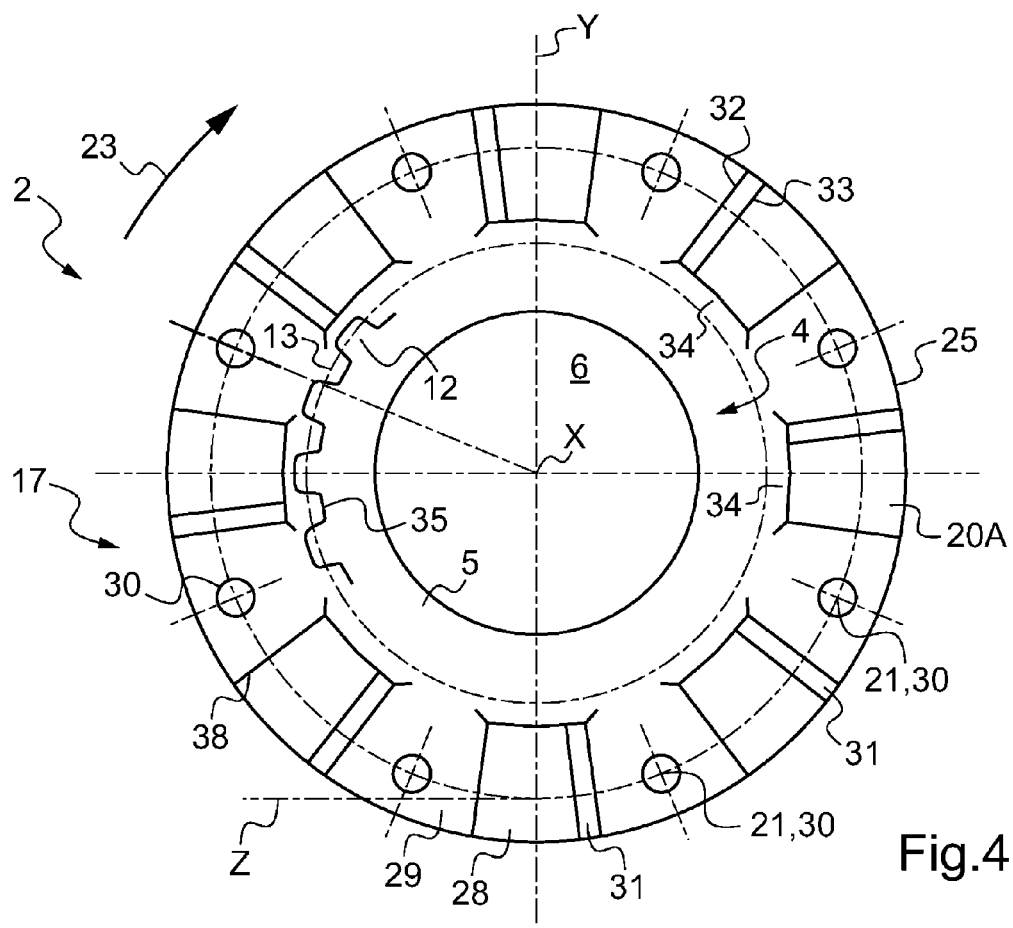
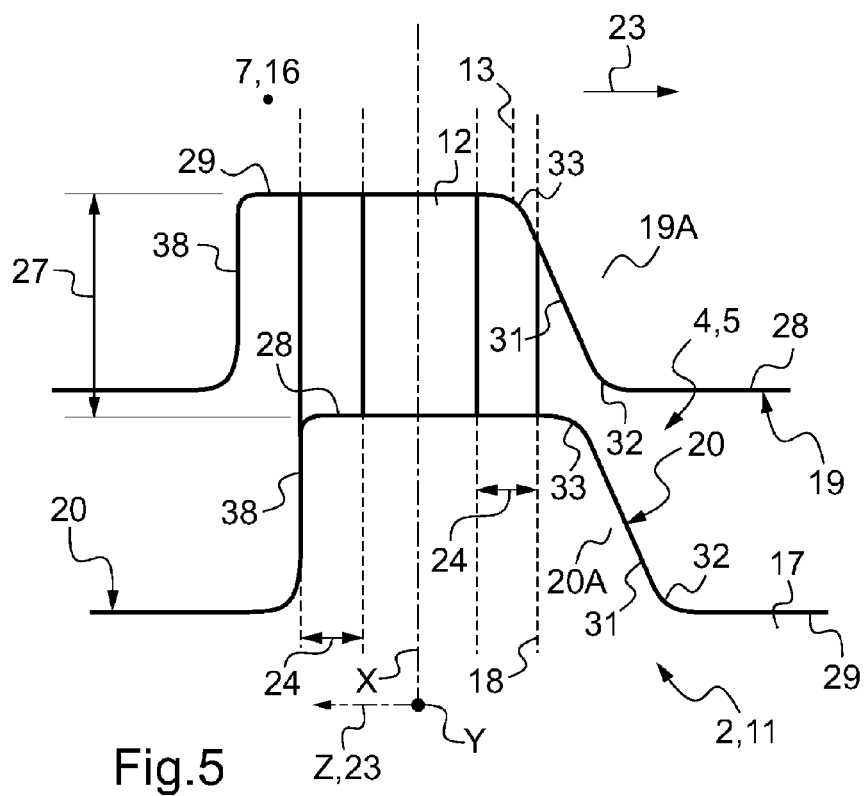
Fig.4
Fig.5

COUPLING WITH SLACK-TAKEUP, A ROTOR, AND A ROTARY WING AIRCRAFT

FIELD OF THE INVENTION

The present invention relates to the general technical field of couplings having splines for transmitting forces and moments in rotation between two coaxial hollow tubes. In such couplings, the purpose of taking up slack is to reduce premature mechanical damage.

More particularly, the invention relates to reducing damage in constant-velocity transmissions that are subjected to forces and moments including a dynamic torsion component of high value, possibly greater than the value of the static component.

BACKGROUND OF THE INVENTION

When two surfaces for transmitting forces and moments are subjected to relative oscillatory motions of small amplitude, a phenomenon of premature damage, known as "fretting" can arise, with central portions of said surfaces being in contact, while around them relative movements of said surfaces appear. This gives rise to premature wear, shear, and fatigue of the elements concerned.

By way of example, such fretting can be observed in the rotors of rotary wing aircraft such as rotorcraft, in which the blades are hinged to flap about dedicated hinges. These flapping hinges of the rotor give rise to Coriolis forces that are exerted on the blades in the plane of rotation of the rotor.

This gives rise to stresses that tend, during each revolution of the rotor, to cause the rotation of the blades to advance and retard angularly about their drag hinges under the action of drag moments, i.e. moments exerted in the drag plane.

These angular variations of the order of plus or minus one degree at a frequency of several hertz have a harmful effect on the lifetime of the corresponding components concerned of the rotor, i.e. the drag hinges in particular, since they generate stresses associated with fretting that increase with increasing stiffness of the components in question. Naturally, the flapping hinges are also likely to be subjected to this type of fretting.

The invention may be applied equally well to the main rotors and to the tail rotors of rotorcraft, in particular helicopters, or to the tilting rotors of convertible rotorcraft, or indeed to helicopter antivibration systems of the incorporated bar resonator type, e.g. such as the system known under the name Sarib® as developed by the Applicant, e.g. replacing therein the arrangement described in document U.S. Pat. No. 6,145,785.

Furthermore, the transmissions in question need to be practical to dismantle (and to reassemble), and to be compact, while also providing an internal longitudinal duct, e.g. for passing pipes and cables. In addition, such transmissions are subjected to the requirements for low weight that are specific to aviation.

As mentioned, the invention is advantageously applicable to mechanical couplings for rotorcraft, and for example it applies equally well to antivibration systems and to main or tail rotors, and indeed to the main constant-velocity drive rotors of convertible aircraft for example, such as those described in documents FR 2 791 319, FR 2 791 634, FR 2 798 359, or FR 2 837 462.

In this context, document FR 2 837 462 describes a rotor for a convertible type rotorcraft, the rotor comprising a mast and a blade-supporting hub that are connected together by a transmission. In one embodiment (FIG. 7), two coaxial tubes, namely an inner tube and an outer tube, presenting substantially equal torsion stiffness but made of materials having different elasticity moduluses, are constrained to rotate together and with the mast by means of a bolted flange. The invention may naturally be applied to such a rotor.

As a result, the mast of the rotor constitutes, in axial extension, the inner tube, with the outer hollow then being driven in rotation by the inner tube, i.e. the mast, by means of splines. That is a solution constituting an alternative to the solution of FIG. 7 document FR 2 837 462, which solution is simpler and less expensive because it has fewer parts, the resulting assembly also being easily dismantled and more compact.

However, the inner and outer tubes drive respective specific rockers, so as to form a constant-velocity drive mechanism for the hub. To do this, it is necessary for the two rockers to be capable of performing small angular movements relative to each other about the axis of rotation of said hub, with the two tubes being stressed in opposite directions.

Consequently, it is important for the two tubes to present twisting rigidities that are substantially equal so as to enable the static drive torque to be shared between them and so as to enable the oscillatory torques that are generated at 2Ω to be balanced, where omega (Ω) represents the frequency of rotation of the rotor, with this being done in such a manner as to make the drive a constant-velocity drive.

Nevertheless, the connection via splines must have no slack or backlash between said splines in order to avoid the appearance of fretting that could result from any such above-mentioned angular slack.

Under such conditions, the invention proposes a novel and unexpected solution that enables two concentric tubes to be mechanically connected together in rotation by mutually engaged splines for the purpose of transmitting rotary drive torque via the tubes, while eliminating fretting.

Naturally, this solution that can be adapted to the constant-velocity drive of a convertible type rotorcraft rotor is also applicable to any mechanism based on a connection via splines between two concentric tubes, one a driving tube and the other a driven tube, and serving to transmit a drive torque.

Document U.S. Pat. No. 4,473,317 describes an anti-return mechanism for a fluted connection, with a central shaft that is substantially solid. An internal axial screw acts via two cams surrounded by the splines of the solid shaft to move the splines out of alignment so as to clamp against the splines of an outer hub.

Document U.S. Pat. No. 4,134,700 describes a fluted connection mechanism between a substantially solid inner shaft and an outer hub. A collar guided on the splines of the solid shaft receives eccentric screws that clamp a frustoconical ring axially, which ring has internal splines.

Document U.S. Pat. No. 4,805,475 describes a device for applying torque to two substantially solid and coaxial gearwheels having two asymmetrical wedges provided in a central cavity thereof, with clamping of the wedges adjusting the male and female splines.

OBJECTS AND SUMMARY OF THE INVENTION

Objects of the present invention are to enable torque to be transmitted between two coaxial hollow tubes that are connected to each other by splines, with dynamic external force and moment/torque components of values that are large, while eliminating slack between the splines so as to reduce damage by premature wear and fretting.

The invention also seeks to make it possible simultaneously to have a coupling that is compact while also keeping space available inside the tubes for passing a variety of equipment.

Another object of the invention is to obtain coupling that is also easy to assemble and to dismantle, in particular without it being necessary to act inside housings for transmission shafts.

To this end, the invention provides a rotary coaxial coupling comprising a hollow inner (or internal) tube and a hollow outer (or external) tube, and complementary splines extending between said tubes in a longitudinal direction, the complementary splines comprising outer splines of the inner tube engaging with inner splines of the outer tube, both splines extending longitudinally, said coupling further including approach means for longitudinally approaching the inner and outer tubes, together with at least one wedge arrangement that, under the effect of said approach means, gives rise to relative pivoting in opposite directions of said inner and outer tubes so as to compensate for any tangential assembly slack.

According to the invention, the coupling comprises a soleplate rigidly secured to a base of one of said tubes that is a driven tube, which soleplate projects radially, a peripheral flange mounted on the other one of said tubes that is a driving tube, said flange having splines complementary to the said splines of the driven tube and in engagement therewith, said coupling also presenting dogs, firstly on a bottom face of the soleplate and secondly on a top face of the peripheral flange, each dog possessing at least one transformation ramp forming a wedge arrangement, while the longitudinal approach means are distributed within the coupling and radially spaced apart from said splines, such that in the tangential slack take-up position, the splines of the driving tube are in engagement with the splines of the flange via the flanks thereof, and downstream therefrom the splines of the driven tube are in engagement with the splines of the driving tube via the flanks thereof.

In certain embodiments, the soleplate is rigidly secured to a base of the driven tube, which is external and extends radially outwards from the coupling, said peripheral flange is mounted on the driving tube, which is internal and outwardly projecting, said flange, which is also external, having splines complementary to the splines of the internal tube and in engagement therewith, while the longitudinal approach means are distributed around the coupling externally relative to said splines, such that in the tangential slack take-up position, the splines of the internal tube are in engagement with the splines of the external flange via the flanks thereof, and downstream therefrom the splines of the internal tube are in engagement with the splines of the external tube via the flanks thereof.

In other embodiments, the soleplate is rigidly secured to a base of the driven tube, which is internal and extends radially outwards from the coupling, said peripheral flange is mounted on the driving tube, which is external and projects inwards, said flange also being internal and having splines complementary to the splines of the external tube and in engagement therewith, while the longitudinal approach means are distributed inside the coupling, internally relative to said splines, such that in the tangential slack take-up position, the splines of the external tube are in engagement with the splines of the internal flange via the flanks thereof, and downstream therefrom the splines of the internal tube are in engagement with the splines of the external tube via the flanks thereof. According to one characteristic, the approach means also act as means for preventing the flange from moving on the inner or outer driving tube in the longitudinal direction.

According to a characteristic, in a radial direction, the approach means are disposed in register with dogs having holes and screw-and-nut fasteners of said approach means located upstream and downstream from each dog around the periphery of the flange and the soleplate.

According to a characteristic, each dog includes a substantially plane force-transformation ramp that is provided between a top of the dog and only one of the bottoms adjacent thereto, a ramp being interposed downstream from such a bottom and upstream from said top.

In an embodiment, in view perpendicular to a radial direction, each force-transformation ramp forms a plane that slopes relative to the longitudinal and radial directions, from left to right and from top to bottom, and defines an angle relative to the longitudinal direction that is of the order of 30 degrees.

In another embodiment, in view perpendicular to a radial direction, each force-transformation ramp forms a plane sloping relative to the longitudinal and radial directions, from left or right and from bottom to top, and defines an angle relative to the longitudinal direction that is of the order of 30 degrees.

According to a characteristic, in projection onto a tangential plane parallel to the longitudinal direction, each dog presents a height equal to the distance between the bottom and top edges and/or substantially twice a "width" distance between said edges in projection onto a plane perpendicular to said longitudinal direction.

According to a characteristic, an engagement "width" dimension equal to a distance in the radial direction between outer and inner rims of each dog is substantially equal to a thickness, not including the flange, of the coupling in said radial direction, said thickness corresponding substantially to the radial thickness of the driving tube with its splines plus the thickness of the driven tube with its splines, and/or said engagement width of the dogs is substantially equal to half an outside diameter (i.e. a radius) of a shell of the driving tube, not including the splines.

According to a characteristic, said engagement width of the dogs is substantially equal in the radial direction to half an inside diameter of a shell of the driven tube, not including the splines.

According to a characteristic, the inner hollow tube, and the outer hollow tube have respective stiffnesses in twisting that are substantially equal, even though their respective materials may have different moduluses of elasticity.

The invention also provides a rotor incorporating at least one coupling as mentioned above.

The invention also provides a rotary wing aircraft, in particular a convertible type rotorcraft, having at least one rotor as mentioned above and/or at least one coupling as mentioned above.

According to a characteristic, the driving hollow tube is connected firstly via a first end to a transmission such as a speed-reducing gearbox, e.g. a main power transmission gearbox (MGB), and secondly via a second end to the blade support hub, and the driven hollow tube is connected to said hub and to the peripheral flange having force-transformation ramps, the hollow tubes surrounding a longitudinal duct for passing equipment of the rotorcraft, such as cabling or pipes. Without going beyond the ambit of the present invention, it is possible in certain circumstances to envisage combining the various above-described embodiments to improve performance.

BRIEF DESCRIPTION OF THE DRAWINGS

Other features and advantages of the invention appear in greater detail on reading the following description, and from the accompanying drawings given purely by way of non-limiting illustration, and in which:

FIG. 1 is a diagrammatic perspective view of a rotorcraft of the invention, of the convertible type, showing two longitudinal axes of rotors that tilt relative to a main direction of a fuselage of said rotorcraft;

FIG. 4 is a view from above on a radial and tangential plane showing a flange having dogs at its circumference and inner coupling splines as shown in FIG. 2;

FIG. 5 is a fragmentary longitudinal and radial view showing a detail of the coupling dogs in accordance with the invention in an initial assembly position (before engagement of the dogs), in which only the splines of a flange and of the driving and driven hollow tubes are in mutual engagement, which engagement presents slack that is not taken up, the dogs still being longitudinally spaced apart;

MORE DETAILED DESCRIPTION

Figure 2:
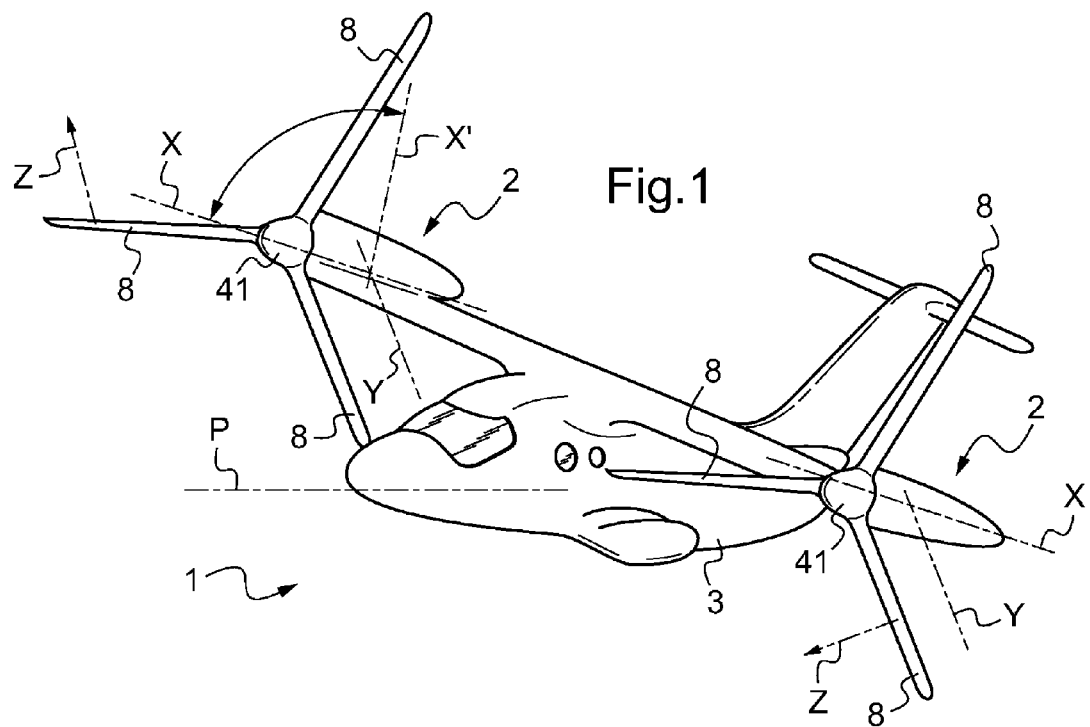
FIG. 2 is a fragmentary longitudinal and radial section view from the outside of a splined coupling in accordance with the invention with slack-takeup dogs engaged under the clamping force of approach means.

In the figures, mention is made of reference directions or axes X, Y, and Z. These axes define a coordinate system as a function of which the various components of the invention are described in their context.

Thus, the X axis is said to be longitudinal. It coincides with the axis about which the constant-velocity couplings and the hollow transmission tubes shown are driven in rotation. Dimensions and positions in length and in height are defined relative to this longitudinal X axis.

The Y axis is said to be radial. It is perpendicular and intersects the X axis. The radial Y axis defines dimensions and positions along radii and diameters of the components of the invention, such as the depths of the splines and the widths of engagement between dogs.

The third axis Z is said to be tangential, and it is perpendicular to the longitudinal X axis and the radial Y axis.

The direction of the rotary speed vectors of the hollow tubes extends along the tangential Z axis, as can be seen in FIG. 1. In a given longitudinal and radial plane, as in FIG. 4, in particular, this tangential Z axis defines tangential dimensions and positions of the components of the invention, such as the plane projections of the slack to be taken up between the upstream and downstream faces or flanks of the splines.

With these X, Y, and Z axes defined, a presently-preferred application of the invention is described with reference to the figures. FIG. 1 shows an aircraft 1 in accordance with the invention. The aircraft 1 is a rotorcraft having two rotors 2, likewise in accordance with the invention. As explained above, the invention is applicable to numerous other types of aircraft 1 or indeed types of rotor 2.

In FIG. 1, the rotors 2 are tiltable relative to the main direction P of the fuselage 3 of the aircraft 1, to enable it to convert between a helicopter mode and an airplane mode.

Put shortly, when the aircraft 1 is in airplane mode, as shown in FIG. 1, the longitudinal X axes of its rotors 2 are substantially parallel to the main direction P of the fuselage 3 so as to make it possible to fly at high speed.

When the aircraft 1 is in helicopter mode, the longitudinal X axes of the rotors 2 are tilted relative to the main direction P of the fuselage 3 as represented by the axis X' (FIG. 1), e.g. through 90°, and the aircraft 1 can thus take off and land vertically, or even hover.

Each rotor 2 includes in particular a drive shaft generally oriented along the X axis and referred to as a "mast". In FIGS. 2 to 7, the mast is of hollow shape, comprising a hollow tube 4, i.e. a tube that essentially possesses an outer shell 5 of generally cylindrical shape, defining a longitudinal duct 6 in its center.

In the examples of FIGS. 2 to 7, the hollow tube 4 forms a driving element in the sense that it is further upstream in the motion-transmitting drive system, while the hollow tube 6 is a driven element. In FIGS. 2 to 7, the driving tube 4 is internal and the driven hollow tube 7 is external.

Figure 3:
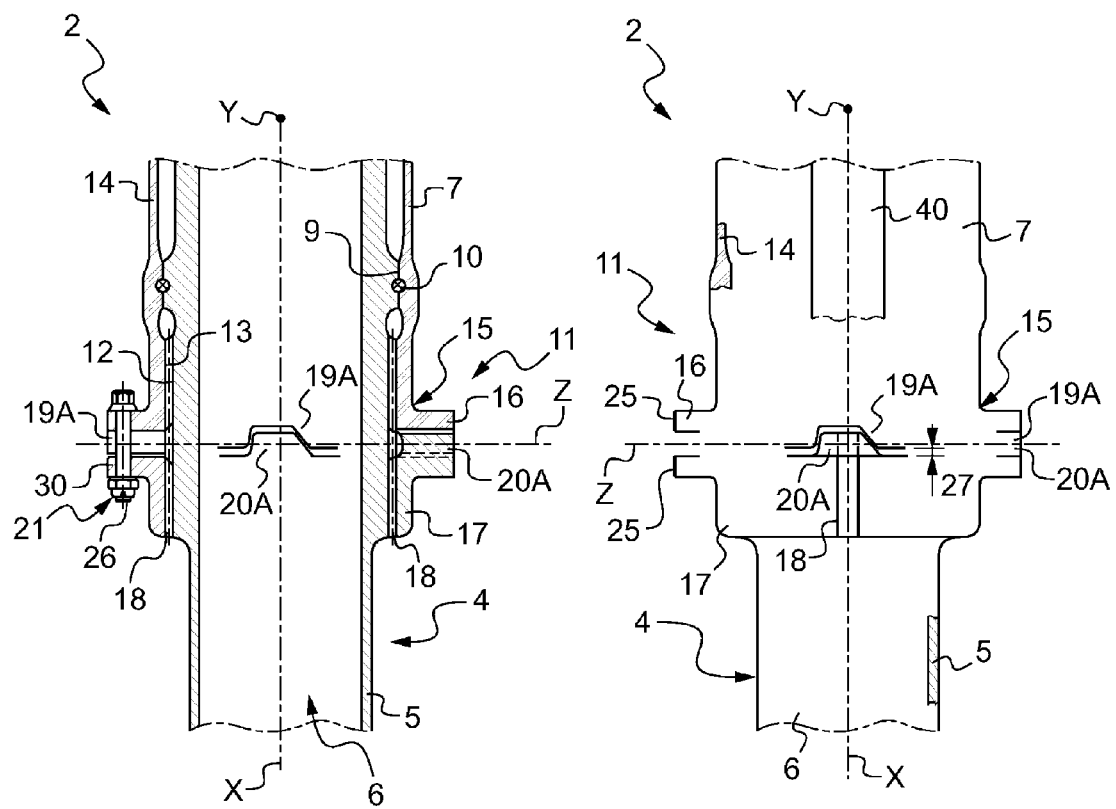
FIG. 3 is a diagrammatic fragmentary longitudinal and radial view of the FIG. 2 coupling, showing the splines and the dogs of a peripheral flange.

The longitudinal duct 6 allows a variety of equipment to pass therealong, such as cables and pipes (shown diagrammatically at 40 in FIG. 3). The pipe 6 also contributes to the light weight of the rotor 2, and thus to the light weight of the entire aircraft that includes it.

It should also be observed that in the figures, along the radial Y direction, the radius of the internal duct 6 is of a size that is considerably greater than the thickness of the shell 5, e.g. at least two to five times greater. In the examples, this ratio is substantially of the order of four times.

From the mechanical point of view, and in particular in terms of the strength of materials, such a hollow tube 4 behaves differently (it is modeled in the form of a shell) than does a non-hollow shaft (modeled as a solid structure). This distinguishes the hollow tubes connected together by the invention from shafts that are generally solid.

Conventionally, the hollow tube 4 of the mast is driven in rotation about the longitudinal X axis by a transmission such as main gearbox (MGB) on a helicopter, which MGB is not shown. Numerical reference 7 designates another hollow tube of the rotor 2. In the examples of FIGS. 2 to 7, the two tubes 4 and 7 are constrained to rotate together and the hollow tube 7 is driven. The driven tube 7 also forms part of the mast, and is engaged longitudinally around the hollow tube 4: reference is thus made herein to an inner hollow tube 4 and to an outer hollow tube 7.

As explained above, in this embodiment, each of the two tubes 4 and 7 drives a rocker. Thereafter, the two rockers drive the hub 41 that supports the blades 8 (FIG. 1).

Although in this configuration the driving tube is the inner tube and the driven tube is the outer tube, the invention naturally also applies to transmissions where the driven tube is the inner tube. For example, this applies in the embodiment shown in FIG. 8, which is described in greater detail below. The blades 8 of the rotor 2, shown in FIG. 1, are functionally connected to the outer tube 7. In other words, the mast comprising the tubes 4 and 7 drives the blades 8 in rotation. For example, these blades 8 are connected to the masts in the manner described in document FR 2 837 462 when the mast is for a rotorcraft.

Firstly the hollow tubes 4 and 7 are mutually positioned coaxially relative to each other by a smooth bearing 9.

FIG. 2 shows clearly that the tube 4 is engaged inside the tube 7 and that the guide bearing 9 is provided with a retaining ring 10.

Insofar as the retaining ring 10 is made of metal, it contributes to axially repositioning the coupling assembly between the driving and driven tubes (i.e. relative to the extended axis of rotation in the X direction). This metal retaining ring 10 also serves to transmit part of the lift produced by the rotor 2 to which these tubes are coupled. Certain embodiments of the retaining ring 10 also give it a sealing function.

Secondly, the hollow tubes 4 and 7 are mutually constrained to rotate together about the longitudinal X axis by a coupling 11 in accordance with the invention, here located below the bearing 9, and at a distance therefrom.

With reference to FIG. 2, it can be seen in overall terms that the coupling 11 in this embodiment comprises in particular:
- on the inner hollow tube 4 (here the driving tube), outer splines 12 (i.e. splines facing radially away from the internal duct 6 along the Y axis), that extend longitudinally (i.e. extending generally along the X direction) and that are obtained by local machining of the outside wall of the shell 5;
- on the outer hollow tube 7 (here the driven tube), inner splines 13 (complementary to the splines 12) likewise obtained by local machining;
- a soleplate 16 rigidly secured to a base 15 of the outer tube 7, and projecting radially outwards from a shell 14 of the tube 7;
- a peripheral flange 17 projecting outwards and mounted on the shell 5 of the driven inner tube 4, and also having splines 18 complementary to the splines 12 of the tube 4 so as to engage therewith; and
- firstly on a bottom face 19 of the soleplate 16 (FIG. 5) and secondly on a top face 20 of the peripheral flange 17 (FIG. 5), respective dogs 19A and 20A suitable for acting like a wedging arrangement. The splines 13 and 18 are thus complementary to the splines 12 in FIG. 2. It can clearly be seen from FIG. 2 that the outer splines 12 extend longitudinally along the X axis beyond the base 15 and the soleplate 16 of the outer hollow tube 7, downwards in the figure. The outer splines 12 thus extend both ways from the bottom and top faces 19 and 20.

In the examples shown, the outer splines 12 are of a longitudinal size that is greater than the total size of the inner splines 13 and the complementary splines 18 of the flange 17. As a result, the splines 12 extend radially along the Y direction in register with the dogs 19A and 20A.

In other words, the outer splines 12 extend between the guide bearing 9 and a longitudinally bottom end of the flange 17. This enables them to receive the inner splines 13 of the outer tube 7 and the complementary splines 18 of the flange 17.

The dogs 19A and 20A form longitudinal and complementary projections on the faces 19 and 20 respectively. The main orientation of the splines 12, 13, and 18 and also the main orientation of the dogs 19A and 20A is essentially longitudinal (in the X direction).

In contrast, the forces that are to be transmitted by the splines 12, 13, and 18 are tangential (in the Z direction), as are the forces that are to be generated by the dogs 19A and 20A.

It can be seen below that the dogs 19A and 20A act under the effect of longitudinal approach means 21 for causing the soleplate 16 and the flange 17 to approach each other. In FIG. 2, these approach means 21 are constituted by eight nut-and-bolt fasteners 26 that extend in the longitudinal X direction.

Figure 7:
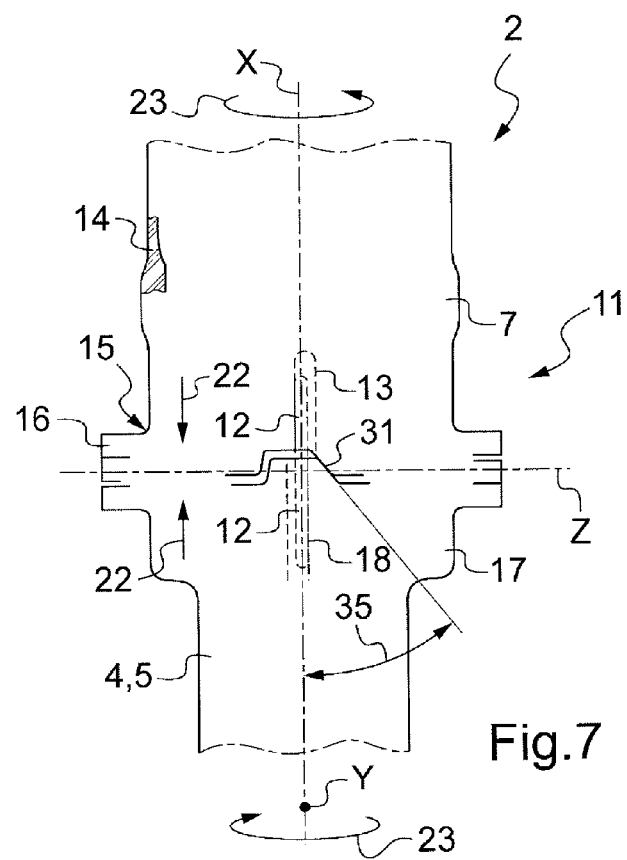
FIG. 7 is a fragmentary longitudinal and radial view of the FIG. 6 coupling, in the clamped position, with the splines of the hollow tubes in mutual engagement with slack taken up, and with the dogs in longitudinal engagement after clamping.

From a functional point of view, it can already be understood that actuating the approach means 21 pulls the flange 17 longitudinally upwards towards the soleplate 16, as represented diagrammatically by oppositely-directed longitudinal arrows 22 shown in FIG. 7.

Because of the interposed dogs 19A and 20A, each with a wedge arrangement that constitutes an optimized shape, as described below, this approach along the arrows 22 causes the tubes 4 to 7 to turn relative to each other as represented by pivot arrows 23 in FIGS. 4 and 7.

Naturally, the pivot direction represented by the arrows 23 is not limiting in any way, and depending on the way in which the approach means 21 are arranged this direction is either counterclockwise (as for the driven tube 7 in FIG. 7), or clockwise for the driving tube, and conversely either clockwise (as for the driving tube 4 in FIG. 7) or counterclockwise for the driven tube, in the same view).

The effect of the longitudinal approach 22 is to cause the inner and outer tubes 4 and 7 to move in relative rotation 23 such that the splines 12 press against the opposite flanks of the complementary splines and 18. This eliminates or takes up all of the tangential slack 24 (FIGS. 5 and 6) that might give rise to premature damage, as explained below.

With reference to FIGS. 2 to 7, the structural aspects of the invention are described in greater detail, and in particular the structural aspects of the coupling 11.

FIG. 5 shows an intermediate assembly position for the coupling 11 prior to slack being taken up, and it can be seen that under such circumstances the splines 18, 12, and 13 are mutually engaged longitudinally, with clearances 24 leaving slack in rotation on either side in projection perpendicularly to the tangential Z direction. In other words, the flanks of the splines 18, 12, and 13 are mutually spaced apart by said clearances 24.

The clearances 24 conventionally enable the tube 7 to be assembled easily around the tube 4, and naturally also allow the splines 12, 13, and 18 to be mutually engaged.

In FIG. 5, the clearances 24 for slack are exaggerated to make them more visible, and they are also shown as being centered or distributed substantially equidistantly on either side of each spline 12 in the direction of rotation 22. In other words, in FIG. 5, the clearances 24 are shown in parallel distributed on the upstream and downstream sides of each spline 12.

In FIGS. 3 and 5, it can be seen that when the tubes 4 and 7 are assembled together, another clearance 27, referred to as longitudinal clearance, is arranged within the coupling 11. This clearance 27 is located between surfaces 19 and 20 and it extends between the top 28 of a dog 20A and the bottom 29 of a dog 19A. The size of the longitudinal clearance 27 varies in the X direction as a function of the clamping state of the coupling 11.

At the beginning of assembly (FIG. 5 or 6), this longitudinal clearance 27 is at a maximum, whereas in an operating state of the coupling 11 (FIG. 7), the clearance 27 is at a minimum.

On sight of these figures, it can also be understood that the peripheral flange 17 is mounted on the splines 12 of the hollow tube 4, initially without being locked in longitudinal position, i.e. the flange 17 is mounted to slide on the tube 4 in the X direction. It is thus the approach means 21 that hold the flange 17 in position on the tube 4 in the longitudinal X direction.

The profile of the dogs 19A and 20A is described below with reference to FIGS. 4 and 5 in particular. Specifically, each dog 19A or 20A possesses a top 28 and a bottom 29, substantially perpendicular to the longitudinal X axis.

It can be seen in particular in FIG. 5 that the tops 28 of the dogs 19A and 20A respectively extend substantially facing corresponding bottoms 29 of the dogs 20A and 19A in the X direction. FIG. 4 shows that the flange 17 has eight dogs 20A. These dogs 20A are angularly offset at substantially 45° relative to the complementary dogs 19A of the soleplate 16, with which they co-operate.

Furthermore, the soleplate 16 and the flange 17 are provided with holes 30 that form part of the approach means 21. The holes 30 in the flange 17 and in the soleplate 16 are disposed facing one another longitudinally in pairs, so as to pass the screws of the fasteners 26.

These screw-and-nut fasteners 26 form part of the approach means 21. As a result, the approach means 21 also act as means for holding the flange 17 stationary on the outer tube 4 in the longitudinal X direction.

In the radial Y direction, the holes 30 are arranged in such a manner that the approach means 21 are in register with the dogs 19A and 20A. In other words, a dog 19A or 20A extends on either side of each hole 30 in the Y direction.

The holes 30 are formed respectively in the bottoms 29 of the flange 17, and close to an outer rim 25 of the soleplate 16, as can clearly be seen in FIGS. 2 and 3. It should be observed that the flange 17 also has an outer rim referenced 25 like that of the soleplate 16.

As a result, the approach means 21 are located outwardly relative to the splines 12, 13, and 18. This would appear to go against the constraints on size and weight imposed on the couplings 11, in particular in the field of aviation.

However, arranging the approach means 21 at diameters that coincide substantially with those of the dogs 19A and 20A, i.e. at common radial locations, gives rise to various surprising advantages.

Thus, this arrangement causes the means 21 to produce clamping that is regularly distributed, and located close to the dogs 19A and 20A. This encourages effective and uniform transformation at the periphery of the coupling 11 of the longitudinal clamping (arrows 22) into clamping in rotation for taking up the slack 24 (arrows 23).

As a result, the coupling 11 of the invention limits fretting and improves the ability of the coupling 11 to withstand high levels of transmitted stress, while still leaving the inside of the hollow tubes 4 and 7 free.

There are eight holes 30 in FIG. 5, and they are formed in the flange 17 and the soleplate 16 for passing the clamping screws 26 (FIG. 2) of the approach means 21. These holes 30, and also the tops 28 and the bottoms 29 are distributed at regular angles around the central X axis.

It should be observed that each dog 19A and 20A includes a force-transformation ramp 31, i.e. a wedge configuration that transforms the longitudinal forces produced by the approach means 21 into turning 23 for taking up the slack 24.

On the flange 17 and also on the soleplate 16, each force-transformation ramp 31 is arranged between each top and only one of the adjacent bottoms 29 of the corresponding dogs 19A or 20A.

For example, in FIG. 5, a ramp 31 of the flange 17 (at the bottom) is interposed downstream (to the left) of such a bottom 29 and upstream (to the right) of the following top 28 in the clockwise direction of the arrow 23 relative to the flange 17.

For the soleplate 16 (towards the top of FIG. 5), since the direction of rotation indicated by arrow 23 in the tangential Z direction is opposite to that of the flange 17, each ramp 31 is downstream (to the right) of a bottom 29 and upstream (to the left) of a following top 28.

Each ramp 31 is substantially plane, with bottom and top radial edges 32 and 23 described in greater detail below. In other words, each dog 19A and 20A is in the form of a tooth or a crenellation, and its single ramp 31 forms a kind of leading edge. Its top and bottom 28 and 29 have no effect on taking up slack 24. Advantageously, the surface of each ramp 31 may present a profile that is helical, thereby contributing in most effective manner in obtaining the relative movement of the elements for assembly, and avoiding certain risks of the coupling 11 jamming.

In the radial Y direction, and as can clearly be seen in FIG. 4, each ramp 31 is defined on the outside by an outer rim 25 of the flange 17, and on the inside by its own rim 34. Each own rim 34 connects the dog 20A to which it belongs from the outside towards the inside to a central core 35 of the flange 17 in which the splines 18 are arranged.

On the soleplate 16, a ramp 31 is interposed between a downstream bottom 29 and the following upstream top 28 in the counterclockwise direction of the corresponding arrows 23. Otherwise, their structure is complementary to that of the flange 17.

With reference to FIGS. 4 and 5, it can be seen that each ramp 31 is defined longitudinally in the X direction by two radial edges, a bottom edge 32 and a top edge 33. On a given dog 19A or 20A, each bottom 32 is defined together by the ramp 31 of the dog and the bottom 29 that extends from the bottom longitudinal end of the ramp 31.

Similarly, on a given dog 19A or 20A, each top edge 33 is defined together by the ramp 31 of the dog and the top 28 that extends from the top longitudinal end of the ramp 31.

In the figures, the bottom and top radial edges 32 and 33 are shown rounded, so as to avoid impeding the relative movements (arrows 22 and 23) of the dogs 19A and 20A, and to avoid superfluous friction.

Each top radial edge 33 extends radially between its own inner rim 34 and the corresponding outer rim 25. The same goes for each bottom radial edge 32.

In a view perpendicular to the radial Y direction, as in FIGS. 2, 3, and 5 to 7, each ramp 31 forms a plane that slopes relative to the longitudinal and radial X and Y directions, from left to right and from top to bottom. Thus, each ramp 31 defines an angle 35 (FIG. 7) relative to the longitudinal direction X that is of the order of 30 degrees.

In other words, in projection on a tangential plane parallel to the longitudinal X direction, each dog 19A or 20A presents a height equal to the distance between the edges 32 and 33 that is substantially twice the "width" distance between the same edges 32 and 33 in projection onto a plane perpendicular to the X direction.

Furthermore, in FIG. 4, it can be seen that the engagement width (i.e. the distance in the radial Y direction between the outer and inner rims 25 and 34) of each dog 19A or 20A is substantially equal to the thickness of the coupling 11 in said Y direction, not including the flange 17. This thickness corresponds to the radial thickness of the inner tube 4 with its splines plus the thickness of the outer tube 7 with its splines 13.

It can also be seen that this engagement width of the dogs 19A and 20A is substantially equal to half the outside diameter of the shell 5 of the tube 4, not including the splines 12.

Similarly, said engagement width of the dogs 19A and 20A is substantially equal in the Y direction to half the inside diameter of the shell 14 of the tube 7, not including the splines 13.

In order to provide the rotation 23 for taking up the slack 24, the ramps 31 of the dogs 19A and 20A come mutually into contact and bear against one another in pairs.

Figure 6:
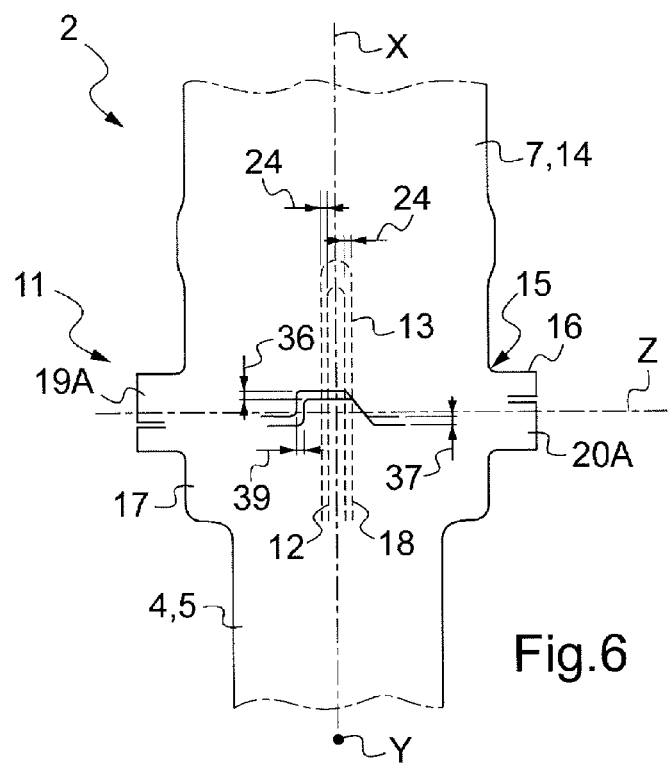
FIG. 6 is a fragmentary longitudinal and radial view of a coupling in accordance with the invention, showing in greater detail an intermediate assembly position (prior to taking up slack), where the splines of the hollow tubes are mutually engaged with clearance that is not taken up, and the dogs are merely in longitudinal contact, without clamping.

Logically, once the ramps 31 of the flange 17 and of the soleplate 16 are bearing against one another, longitudinal and functional spaces 36 and 37 are maintained as shown in FIG. 6.

The longitudinal functional spaces 36 are said to be upper spaces since they extend between the bottoms 29 of the dogs 19A of the soleplate 16 and the tops 28 of the dogs 20A of the flange 17. The longitudinal functional spaces 37 are said to be lower spaces since they extend between the bottoms 29 of the dogs 20A of the flange 17 and the tops 28 of the dogs 19A of the soleplate 16.

FIGS. 4 and 5 also show a downstream face 38 of each dog 19A or 20A. On a given dog 19A or 20A, the downstream face 38 is opposite from the following ramp 31 in the tangential Z direction, between the top 28 and the corresponding bottom 29. In the example of FIG. 5, the downstream face 38 of each dog 19A or 20A is substantially parallel to the longitudinal X axis.

Between the downstream faces 38 of two dogs 19A and 20A having their ramps 31 in contact, there is provided another functional space 39 referred to as a downstream face (FIG. 6). On a given dog 19A or 20A, the downstream face 39 is disposed opposite the ramp 31, between the downstream faces 38 of the dogs 19A and 20A.

When the approach means 21 are activated by being clamped, this downstream space 39 tends to shrink, in the sense that the downstream faces 38 of two dogs 19A and 20A then approach each other when the ramps 31 interact to generate turning as represented by the arrows 23.

Substantially the same applies for the spaces 36 and 37, which decrease in proportion to the activation of clamping by the means 21. The space 36 corresponds to the space 37 when two dogs 19A and 20A are mutually engaged.

With the main structural aspects explained above, there follows a description of the method of the invention for taking up slack, or more precisely of its principles of operation.

Under the effect of the approach represented by the arrows 22, the inner tube 4 and the outer tube 7 are caused to turn relative to each other (arrow 23) so that the splines 12 comes to press against the opposite flanks of the complementary splines 13 and 18.

In other words, with the coupling 11 of the invention, the splines 18, 12, and 13 are subjected to prestress by the dogs 19A and 20A, thereby taking up the tangential slack 24 that would otherwise give rise to premature damage in the coupling 11, in particular by wear and by fretting.

In outline, movements take place as follows: clamping the means 21 presses the flange 17 longitudinally towards the soleplate 16, and thus presses the dogs 19A and 20A against one another.

Because of their wedge shape (described in detail above), this longitudinal clamping (arrows 22) causes the flange 17 initially to turn (arrows 23) about the longitudinal axis (X direction), with the splines 18 of the flange 17 pressing against the splines 12 of the inner tube 4.

The splines 12 are then caused to turn 23, thereby engaging the splines 13 of the outer tube 7.

By comparing FIGS. 6 and 7, it can be seen that once pressed together under the effect of these opposite turning movements 23, the downstream flanks (i.e. on the right in FIGS. 6 and 7) of the bottom portions of the outer splines 12 (facing the flange 17 in particular) are pressed against the upstream flanks of the splines 18 of the flange 17.

The downstream flanks (i.e. to the left in FIGS. 6 and 7) of the upper portions (facing the soleplate 16 in particular) of the outer splines 12 are then pressed against the upstream flanks of the upper splines 13 of the hollow tube 7.

As a result, although spaces are maintained within the coupling 11 (between the downstream flanks of the splines 12 and 18 in the lower portion, and between the upstream flanks of the splines 12 and 13 in the upper portion), the means 21 in combination with the dogs 19A and 20A acting like a plurality of wedge arrangements distributed around the coupling 11 take up the functional slack 24 that could give rise to premature wear.

In FIG. 7, it can be seen that the hollow tube 7 and the flange 17 are urged to pivot along arrows 23 in the clockwise direction (when seen from above as in FIG. 4), while the hollow tube 7 is subjected to torque in the opposite direction, i.e. counterclockwise.

By means of the invention, and as can be seen in FIG. 7, the splines 12 of the inner tube 4 are held in a vice-grip between the splines 18 of the flange 17 in the lower portion, and the splines 13 of the outer tube 7 in the upper portion. This enables the coupling 11 to provide exceptional stability in the face of successive speeding up and slowing down of the torque transmitted by the coupling 11 between the hollow tubes 4 and 7. Whatever the direction of the stress transmitted by the splines 12, 13, and 18, a significant fraction (lower or upper) thereof is pressed together by the stress. As a result, local losses of contact and relative movement between the flank zones of the splines in the coupling 11 are limited or even eliminated.

In the embodiment of the invention shown in FIGS. 2 to 7, such coupling 11 is incorporated in a rotor mast 2 of a rotorcraft.

Under such circumstances, the hollow inner tube 4 and the hollow outer tube 7, and unlike the peripheral flange 17 with force-transformation ramps 31, present their own stiffnesses in torsion that are substantially equal, even though their respective materials may present moduluses of elasticity that are different.

The present invention also provides a rotary wing aircraft 1, in particular a convertible rotorcraft.

The inner hollow tube 4 that is connected to a transmission such as a main gearbox, and the outer hollow tube 7 that is connected to a hub (shown at 41 in FIG. 1) for supporting blades 8, and the peripheral flange 17 having force-transformation ramp 31, then together surround a longitudinal duct 6 suitable for passing equipment (represented by reference 40 in FIG. 3) of the rotorcraft 1, such as cabling or pipes.

Figure 8:
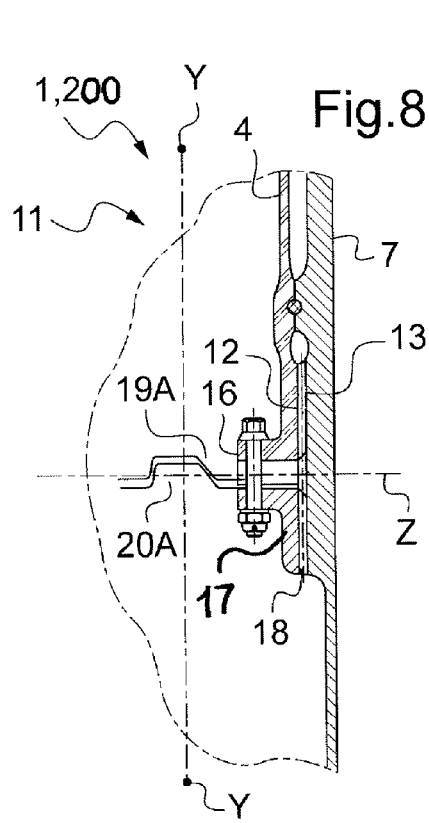
FIG. 8 is a fragmentary diagrammatic view similar to FIG. 2 showing a coupling of the invention in which the driven tube is on the inside, as is the flange, typically suitable for being incorporated in a bar-type antivibration system, and thus in a rotary wing aircraft.

Another embodiment is shown in FIG. 8.

By way of example, such an embodiment may be applied to an antivibration system having an incorporated bar resonator, the system being for a rotary wing aircraft 1 such as a helicopter, and being of the kind known under the name Sarib®. Under such circumstances, numerical reference 200 designates such a system. Unless stated to the contrary, numerical references that are identical to those of FIGS. 1 to 7 designate items that are similar in FIG. 8.

In FIG. 8, the soleplate 16 is rigidly secured to a base of the inner tube 4, which is driven. This soleplate 16 projects radially inwards, and the peripheral flange 17 is here mounted on the outer tube 7, which is driving. The flange 17 projects inwards, and is internal, like the driven tube 4. This embodiment presents greater compactness since the flange 17 is inside the coupling 11.

As in the other embodiments, the coupling 11 presents splines 12, 13 complementary to the splines 18. Thus, the inner flange 17 has splines 18 complementary to the splines 13 of the outer tube 7, and in engagement therewith.

In FIG. 8, the longitudinal approach means are distributed inside the coupling 11 and inside said splines, such that in the tangential slack take-up position, the splines 13 of the outer tube 7 are in engagement with the splines 18 of the inner flange 17 via the flanks thereof, and downstream therefrom the splines 12 of the inner tube 4 are in engagement with the splines 18 of the inner flange 17 via the flanks thereof.

Naturally, the invention may be subjected to numerous variant implementations. Although several embodiments are described, it will readily be understood that it is not conceivable to identify exhaustively all possible embodiments. It is naturally possible to envisage replacing any of the means described by equivalent means, without thereby going beyond the ambit of the invention.

In particular, the surface of each ramp 31 that slopes relative to the longitudinal and radial X and Y directions may, in certain embodiments, go from left to right and bottom to top. Under such circumstances, the longitudinal clamping in the X direction causes the flange 17 to turn in the direction opposite to that marked by the arrow 23. In practice, such sloping surfaces are selected as a function of the set of rotary stresses that are to be applied to the driving and driven tubes 7 and 4.

What is claimed is:

1. A coaxial rotary coupling (11) comprising a hollow inner tube (4) and an outer tube (7), the tubes (4; 7) being provided with complementary splines (12; 13) in mutual engagement and extending in a longitudinal direction (X), said coupling (11) further including longitudinal approach means (21) for longitudinally approaching the inner and outer tubes (4, 7), together with at least one wedge arrangement (19A, 20A, 31) that acts, under the effect of said approach means (21), to cause the inner and outer tubes (4, 7) to pivot (23) relative to each other in opposite directions so as to compensate for assembly slack (24), wherein the coupling (11) comprises:
a soleplate (16) rigidly secured to a base (15) of one of said tubes that is a driven tube (4; 7), which soleplate projects radially;
a peripheral flange (17) mounted on the other one of said tubes (4; 7) that is a driving tube, said flange (17) having splines (18) complementary to the said splines (12) of the driven tube (4; 7) and in engagement therewith; and
dogs, firstly on a bottom face (19) of the soleplate (16) and secondly on a top face (20) of the peripheral flange (17), each dog (19A, 20A) possessing at least one transformation ramp (31) forming a wedge arrangement, while the longitudinal approach means (21) are distributed within the coupling (11) and radially spaced apart from said splines (12, 13, 18), such that in the tangential slack take-up position, the splines (12, 13) of the driving tube (7; 4) are in engagement with the splines (18) of the flange (17) via the flanks thereof, and downstream therefrom the splines (13, 12) of the driven tube (4; 7) are in engagement with the splines (12, 13) of the driving tube (7; 4) via the flanks thereof.

2. A coupling (11) according to claim 1, wherein the soleplate (16) is rigidly secured to a base (15) of the driven tube, which is external (7) and extends radially outwards from the coupling (11), said peripheral flange (17) is mounted on the driving tube, which is internal (4) and outwardly projecting, said flange (17), which is also external, having splines (18) complementary to the splines of the internal tube (4) and in engagement therewith, while the longitudinal approach means (21) are distributed around the coupling (11) externally relative to said splines (12, 13, 18), such that in the tangential slack take-up position, the splines (12) of the internal tube (4) are in engagement with the splines (18) of the external flange (17) via the flanks thereof, and downstream therefrom the splines (13) of the internal tube (7) are in engagement with the splines (12) of the external tube (4) via the flanks thereof.

3. A coupling (11) according to claim 1, wherein the soleplate (16) is rigidly secured to a base (15) of the driven tube, which is internal (4) and extends radially outwards from the coupling (11), said peripheral flange (17) is mounted on the driving tube, which is external (7) and projects inwards, said flange (17) also being internal and having splines (18) complementary to the splines (13) of the external tube (7) and in engagement therewith, while the longitudinal approach means (21) are distributed inside the coupling (11), internally relative to said splines (12, 13, 18), such that in the tangential slack take-up position, the splines (13) of the external tube (7) are in engagement with the splines (18) of the internal flange (17) via the flanks thereof, and downstream therefrom the splines (21) of the internal tube (4) are in engagement with the splines (13) of the external tube (7) via the flanks thereof.

4. A coupling (11) according to claim 1, wherein the approach means (21) also act as means for preventing the flange (17) from moving on the driving tube (7; 4) in the longitudinal direction (X).

5. A coupling (11) according to claim 1, wherein in a radial direction (Y), the approach means (21) are disposed in register with dogs (19A, 20A) having holes (30) and screw-and-nut fasteners (26) of said approach means (21) located upstream and downstream from each dog (19A, 20A) around the periphery of the flange (17) and the soleplate (16).

6. A coupling (11) according to claim 1, wherein each dog (19A, 20A) includes a substantially plane force-transformation ramp (31) that is provided between a top (28) of the dog and only one of the bottoms (29) adjacent thereto, a ramp (31) being interposed downstream from such a bottom (29) and upstream from said top (28).

7. A coupling (11) according to claim 1, wherein, in view perpendicular to a radial direction (Y), each force-transformation ramp (31) forms a plane that slopes relative to the longitudinal and radial directions (X and Y), from left to right and from top to bottom, and defines an angle (35) relative to the longitudinal direction (X) that is of the order of 30 degrees.

8. A coupling (11) according to claim 1, wherein, in view perpendicular to a radial direction (Y), each force-transformation ramp (31) forms a plane sloping relative to the longitudinal and radial directions (X and Y), from left or right and from bottom to top, and defines an angle (35) relative to the longitudinal direction that is of the order of 30 degrees.

9. A coupling (11) according to claim 1, wherein, in projection onto a tangential plane parallel to the longitudinal direction (X), each dog (19A or 20A) presents a height equal to the distance between the bottom and top edges (32 and 33) and/or substantially twice a width distance between said edges (32, 33) in projection onto a plane perpendicular to said longitudinal direction (X).

10. A coupling (11) according to claim 1, wherein an engagement width dimension equal to a distance in the radial direction (Y) between outer and inner rims (25 and 34) of each dog (19A or 20A) is substantially equal to a thickness, not including the flange (17), of the coupling (11) in said radial direction (Y), said thickness corresponding substantially to the radial thickness of the driving tube (7; 4) with its splines (12) plus the thickness of the driven tube (4; 7) with its splines (13), and/or said engagement width of the dogs (19A, 20A) is substantially equal to half an outside diameter of a shell (5) of the driving tube (7; 4), not including the splines (12).

11. A coupling (11) according to claim 10, wherein said engagement width of the dogs (19A, 20A) is substantially equal in the radial direction (Y) to half an inside diameter of a shell (14) of the driven tube (4; 7), not including the splines (13).

12. A rotor (2) for a rotary wing aircraft (1) having at least one coupling (11) according to claim 1 incorporated therein, wherein the inner hollow tube (4), and the outer hollow tube (7) have respective stiffnesses in twisting that are substantially equal, even though their respective materials may have different moduluses of elasticity.

13. A rotary wing aircraft (1), in particular a convertible rotorcraft (1), of the type including at least one rotor (2) according to claim 12, wherein the driving hollow tube (4; 7), which is connected firstly via a first end to a transmission such as a speed-reducing gearbox, and which is connected secondly via a second end to a hub (41) for supporting blades (8), and the driven hollow tube (7; 4), which is connected to said hub (41) and to the peripheral flange (17) having force-transformation ramps (31), together surround a longitudinal duct (6) for passing equipment (40) of the rotorcraft (1).

* * * * *